United States Patent
Yang et al.

(10) Patent No.: US 8,659,916 B2
(45) Date of Patent: Feb. 25, 2014

(54) CONTROL CIRCUIT WITH ZVS-LOCK AND ASYMMETRICAL PWM FOR RESONANT POWER CONVERTER

(75) Inventors: Ta-Yung Yang, Milpitas, CA (US); Tien-Chi Lin, New Taipei (TW)

(73) Assignee: System General Corp., Taipei Hsien (TW)

( * ) Notice: Subject to any disclaimer, the term of this patent is extended or adjusted under 35 U.S.C. 154(b) by 78 days.

(21) Appl. No.: 13/478,252

(22) Filed: May 23, 2012

(65) Prior Publication Data

US 2012/0300503 A1   Nov. 29, 2012

Related U.S. Application Data

(60) Provisional application No. 61/489,000, filed on May 23, 2011.

(51) Int. Cl.
*H02M 3/335* (2006.01)

(52) U.S. Cl.
USPC .................. 363/21.03; 363/21.12; 363/21.15; 363/21.17; 363/21.18; 363/24; 363/25; 363/26

(58) Field of Classification Search
USPC .......... 363/21.02, 21.03, 21.12, 21.15, 21.17, 363/21.18, 24, 25, 26
See application file for complete search history.

(56) References Cited

U.S. PATENT DOCUMENTS

| | | | | |
|---|---|---|---|---|
| 4,535,399 | A * | 8/1985 | Szepesi ........................... | 363/41 |
| 4,814,962 | A * | 3/1989 | Magalhaes et al. ............ | 363/16 |
| 6,018,467 | A * | 1/2000 | Majid et al. .................... | 363/16 |
| 6,154,375 | A * | 11/2000 | Majid et al. .................... | 363/16 |
| 7,313,004 | B1 | 12/2007 | Yang et al. | |
| 7,375,987 | B2 * | 5/2008 | Kyono ....................... | 363/21.02 |
| 7,733,669 | B2 * | 6/2010 | Jiao et al. ........................ | 363/16 |
| 8,045,348 | B2 * | 10/2011 | Zhu et al. ........................ | 363/49 |
| 8,085,558 | B2 * | 12/2011 | Choi ........................... | 363/21.02 |
| 8,085,559 | B1 * | 12/2011 | Choi ........................... | 363/21.02 |
| 2010/0202162 | A1 | 8/2010 | Yang et al. | |

* cited by examiner

*Primary Examiner* — Bao Q Vu
(74) *Attorney, Agent, or Firm* — Rosenberg, Klein & Lee

(57) ABSTRACT

A control circuit for a resonant power converter and a control method thereof are disclosed. The control circuit comprises a first transistor and a second transistor switching a transformer through a resonant tank. A controller receives a feedback signal for generating a first switching signal and a second switching signal coupled to drive the first transistor and the second transistor respectively. The feedback signal is correlated to an output of the resonant power converter. A diode is coupled to the second transistor for detecting the state of the second transistor for the controller. The first switching signal and the second switching signal are modulated to achieve a zero voltage switching (ZVS) for the second transistor.

18 Claims, 8 Drawing Sheets

CONTROL CIRCUIT WITH ZVS-LOCK AND ASYMMETRICAL PWM FOR RESONANT POWER CONVERTER

REFERENCE TO RELATED APPLICATION

This application is based on Provisional Patent Application Ser. No. 61/489,000, filed 23 May 2011, currently pending.

BACKGROUND OF THE INVENTION

1. Field of Invention

The present invention is related to a control circuit, especially to a control circuit with ZVS-lock and asymmetrical PWM for resonant power converter.

2. Description of Related Art

For achieving higher efficiency, a switching frequency of the resonant power converter should be closely to the resonant frequency of the resonant power converter during a heavy load and/or the low input voltage conditions. In other words, the switching frequency of the resonant power converter should be at the ZVS (zero voltage switching) regions (regions 1 and 2 shown in FIG. 2) during the heavy load and/or the low input voltage conditions. However, when the switching frequency is decreased in response to the increase of the load and/or the decrease of the input voltage of the resonant power converter, the switching frequency might fall into the ZCS (zero current switching) region (region 3 shown in FIG. 2). The control of the resonant power converter would become a none-linear operation if the switching frequency is decreased to fall into the region 3. Besides, the resonant power converter is operated at higher switching frequency during the light load, which will increase the switching loss and result poor efficiency. The description of the resonant power converter and asymmetrical PWM operation for the resonant power converter can be found in the prior arts of "Switching controller for resonant power converter", U.S. Pat. No. 7,313,004; "ASYMMETRICAL RESONANT POWER CONVERTERS", U.S. patent application N.O. 2010/0202162.

Therefore, the present invention is developed to prevent that the resonant power converter is operated in region 3 and ensure the ZVS (zero voltage switching) operation for heavy load. Furthermore, the present invention develops a method that allows the resonant power converter operated at the PWM mode with ZVS for light load to achieve power saving.

SUMMARY OF THE INVENTION

The present invention develops a control circuit for a resonant power converter that ensures the ZVS (zero voltage switching) operation for heavy load. Furthermore, the present invention develops a method that allows the resonant power converter operated at the PWM mode with ZVS for light load to achieve power saving. In other words, because the maximum power transfer and the maximum efficiency can be realized for the switching frequency operated at the resonant frequency, the design of the present invention allows the switching frequency operated closely to the resonant frequency and prevents the region 3 operation that is the object of the present invention.

The control circuit for the resonant power converter according to the present invention comprises a first transistor, a second transistor, a controller, and a diode. The first transistor and the second transistor switch a transformer through a resonant tank. The controller receives a feedback signal for generating a first switching signal and a second switching signal coupled to drive the first transistor and the second transistor respectively. The feedback signal is correlated to an output of the resonant power converter. The diode is coupled to the second transistor for detecting the state of the second transistor for the controller. The first switching signal and the second switching signal are modulated to achieve a zero voltage switching (ZVS) for the second transistor.

The method for controlling the resonant power converter according to the present invention comprises the following steps: receiving a feedback signal for generating a switching signal; switching a transformer and a resonant tank through a transistor; detecting the state of the transistor for zero voltage switching (ZVS); and limiting a minimum switching frequency of the transistor for achieving the ZVS. The transistor is driven by the switching signal, and the feedback signal is correlated to an output of the resonant power converter.

BRIEF DESCRIPTION OF ACCOMPANIED DRAWINGS

The accompanying drawings are included to provide a further understanding of the present invention, and are incorporated in and constitute a part of this specification. The drawings illustrate embodiments of the present invention and, together with the description, serve to explain the principles of the present invention. In the drawings, FIG. 1 shows a schematic diagram of a control circuit of a resonant power converter in accordance with the present invention.

DETAILED DESCRIPTION OF THE EMBODIMENTS

Figure 1:
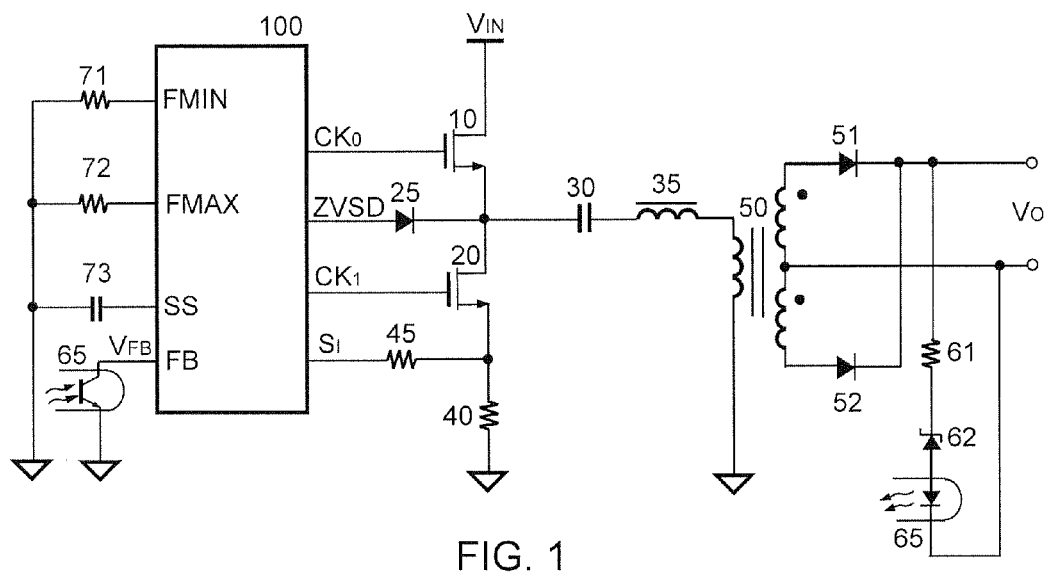

FIG. 1 shows a schematic diagram of a control circuit of a resonant power converter in accordance with the present invention. The resonant power converter comprises a controller 100, a first transistor 10, a second transistor 20, a diode 25, capacitors 30 and 73, an inductor 35, resistors 40, 45, 71 and 72, a transformer 50, rectifiers 51 and 52, a feedback resistor 61, a zener diode 62, and an opto-coupler 65. The controller 100 generates a first switching signal $CK_0$ and a second switching signal $CK_1$ in response to a feedback signal $V_{FB}$ from a feedback terminal FB of the controller 100. Gate terminals of the transistors 10 and 20 are coupled to the controller 100 respectively. The transistors 10 and 20 are controlled by the switching signals $CK_0$ and $CK_1$ respectively.

An input voltage $V_{IN}$ is supplied with a drain terminal of the transistor 10. A source terminal of the transistor 10 is coupled to a drain terminal of the transistor 20, one terminal of the capacitor 30 and a cathode of the diode 25. An anode of the diode 25 is coupled to the controller 100. The diode 25 is connected to the transistor 20 for detecting a ZVS state of the transistor 20. When the transistor 20 is turned on and the ZVS state is detected, the diode 25 generates a ZVS-detection signal ZVSD to the controller 100.

A voltage divider has two resistors 45 and 40 connected each other in series. One terminal of the resistor 45 is coupled to the controller 100. The other terminal of the resistor 45 is connected to a source terminal of the transistor 20 and one terminal of the resistor 40. The other terminal of the resistor 40 is connected to the ground. In other words, the source terminal of the transistor 20 is coupled to a joint of the resistors 45 and 40. A switching current is a current through flowing the transistor 20. The resistor 40 is utilized to detect the switching current when the transistor 20 is turned on by the switching signal $CK_1$. The switching current is further utilized to generate a signal $S_1$ for the controller 100 through the resistor 45. The signal $S_1$ is conventional signal, so here is no detailed description about it. The other terminal of the capacitor 30 is connected to one terminal of the inductor 35. The other terminal of the inductor 35 is coupled to a primary winding of the transformer 50. The capacitor 30 and the inductor 35 form the resonant tank. The transistors 10 and 20 are coupled to the resonant tank and switch the resonant tank and the transformer 50. The transistors 10 and 20 switch the transformer 50 through the resonant tank.

Cathodes of the rectifiers 51 and 52 are connected together. Anodes of the rectifiers 51 and 52 are connected to a secondary winding of the transformer 50 for generating an output voltage $V_O$ of the resonant power converter. The feedback resistor 61, the zener diode 62 and the opto-coupler 65 develop a feedback circuit for generating the feedback signal $V_{FB}$ in accordance with the output voltage $V_O$. One terminal of the feedback resistor 61 is coupled to cathodes of the rectifiers 51 and 52 and an output terminal of the resonant power converter for receiving the output voltage $V_O$. The other terminal of the feedback resistor 61 is coupled to a cathode of the zener diode 62. An anode of the zener diode 62 is coupled to an input terminal of the opto-coupler 65. An output terminal of the opto-coupler 65 is coupled to the feedback terminal FB of the controller 100. That is to say, the feedback terminal FB receives the feedback signal $V_{FB}$ from the output terminal of the opto-coupler 65 of the feedback circuit.

The resistor 71 is coupled to a FMIN terminal of the controller 100 to determine a minimum switching frequency of the resonant power converter. The resistor 72 is coupled to a FMAX terminal of the controller 100 to determine a maximum switching frequency of the switching signals $CK_0$ and $CK_1$ for determining the maximum switching frequency of the resonant power converter. The capacitor 73 is connected to a soft-start terminal SS of the controller 100 for a soft-start of the resonant power converter. The resistor 71, the resistor 72, and the capacitor 73 are further coupled to the ground.

Figure 2:
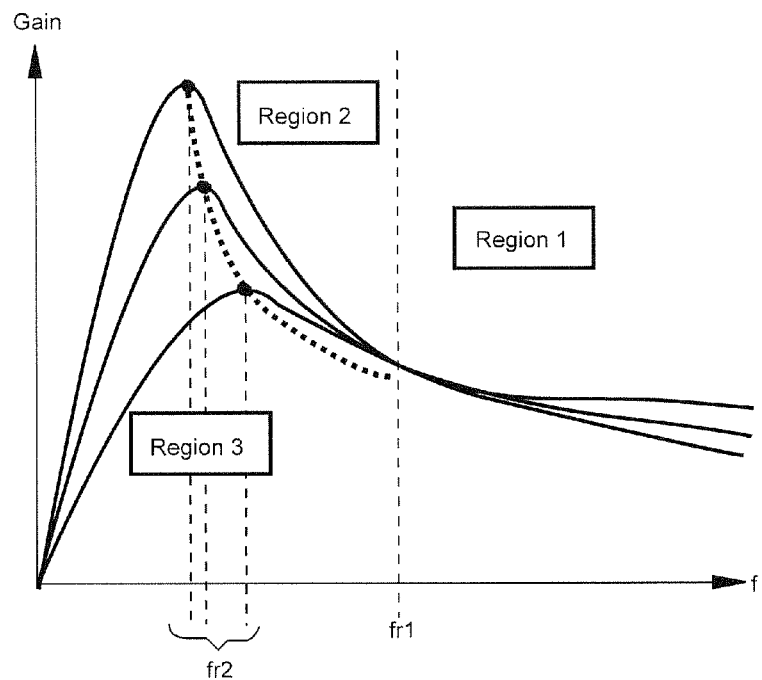
FIG. 2 shows a gain-frequency waveform of the resonant tank of the resonant power converter.

FIG. 2 shows a gain-frequency waveform of the resonant power converter that shows a transfer function of the resonant tank of the resonant power converter. The definition of the "region 1" is the operation region for the switching frequency higher than the resonant frequency fr1. The definition of the "region 2" is the operation region for the switching frequency higher than the resonant frequency fr2 and lower than the resonant frequency fr1. The impedance of the resonant tank is inductance for both the region 1 and the region 2, thus the zero-voltage-switching (ZVS) can be achieved at the heavy load for the switching of transistors 10 and 20 of the resonant power converter. A "region 3" is the operation region for the switching frequency lower than the resonant frequency fr2. The resonant frequency fr2 is changed correspond to the load situation of the resonant power converter. The impedance of the resonant tank is capacitance at the region 3, thus the ZVS cannot be achieved.

The resonant frequencies fr1 and fr2 of the resonant tank of the resonant power converter can be expressed by, $$fr1 = (\sqrt{LrCr})^{-1}$$

$$fr2 = (\sqrt{(Lr+Lm)Cr})^{-1}$$

The inductance Lr is the equivalent series inductance of the resonant tank, it is major determined by the inductor 35 of the resonant tank. The capacitance Cr is equivalent series capacitance of the resonant tank, it is decided by the capacitance of the capacitor 30 of the resonant tank. The inductance Lm is the magnetizing inductance of the primary winding of the transformer 50. The inductance Lm associated with the inductance Lr and the capacitance Cr determine another resonant frequency fr2 of the resonant tank. Different curves shown in FIG. 2 represent values of gain of different quality factors, which is well-known as "Q" value. The following discussion regards to any single curve shown in FIG. 2.

For the feedback loop control of the resonant power converter, the output voltage $V_O$ is increased in response to the decrease of the switching frequency for the operation at region 1 or region 2. However, the output voltage $V_O$ is decreased in response to the decrease of the switching frequency in the region 3 operation. Therefore, for preventing this none-linear operation, the region 3 operation should be avoided.

Figure 3:
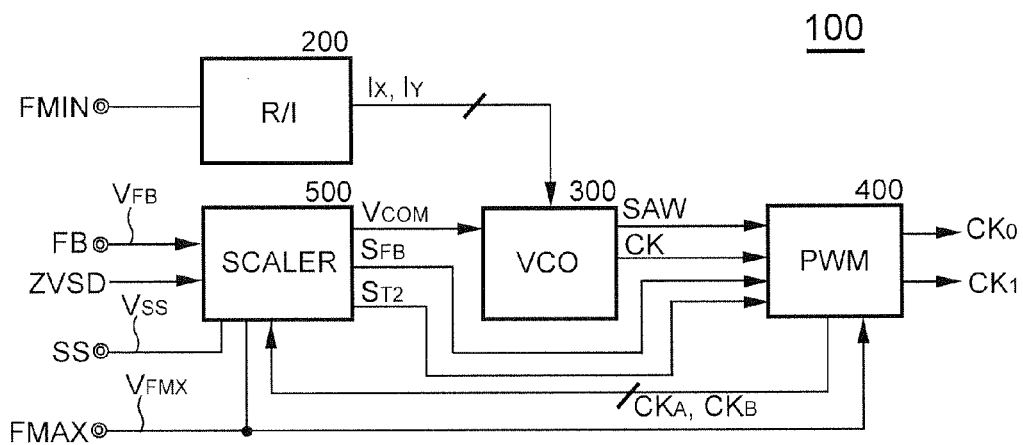
FIG. 3 shows a schematic diagram of an embodiment of the controller of the control circuit in accordance with the present invention.

FIG. 3 is a schematic diagram of an embodiment of the controller 100 in accordance with the present invention. The controller 100 comprises a minimum-frequency programming circuit (R/I) 200, an oscillator (VCO) 300, a PWM circuit (PWM) 400, and an input circuit (SCALER) 500. The minimum-frequency programming circuit 200 is coupled to the resistor 71 (as shown in FIG. 1) through the FMIN terminal of the controller 100. The minimum-frequency programming circuit 200 generates currents $I_X$ and $I_Y$ in accordance with an impedance of the resistor 71. The input circuit 500 is coupled to the opto-coupler 65 through the feedback terminal FB, the diode 25, the capacitor 73 through the soft-start terminal SS, the resistor 72 through the FMAX terminal, the oscillator 300 and the PWM circuit 400.

The feedback signal $V_{FB}$ is generated at the feedback terminal FB in accordance with the output voltage $V_O$ (as shown in FIG. 1). The ZVS-detection signal ZVSD is generated at the anode of the diode 25 (as shown in FIG. 1) when the ZVS state is detected. A soft-start signal $V_{SS}$ is generated at the soft-start terminal SS in accordance with a capacitance of the capacitor 73 (as shown in FIG. 1). A control signal $V_{COM}$ is generated by the input circuit 500 according to the feedback signal $V_{FB}$, the ZVS-detection signal ZVSD, the soft-start signal $V_{SS}$ and a maximum-frequency signal $V_{FMX}$. In other words, the input circuit 500 generates the control signal $V_{COM}$ according to the feedback signal $V_{FB}$, the maximum-frequency signal $V_{FMX}$, and the state of the second transistor 20. The maximum-frequency signal $V_{FMX}$ is generated at the FMAX terminal in accordance with an impedance of the resistor 72 (as shown in FIG. 1).

An input signal $S_{FB}$ is correlated to the feedback signal $V_{FB}$. The input circuit 500 further receives signals $CK_A$ and $CK_B$ from the PWM circuit 400. The signals $CK_A$ and $CK_B$ are correlated to the switching signals $CK_0$ and $CK_1$. So, the input circuit 500 further receives the switching signals $CK_0$ and $CK_1$ from the PWM circuit 400. Therefore, the input circuit 500 further generates the input signal $S_{FB}$ and a latch signal Sp according to the feedback signal $V_{FB}$, the ZVS-detection signal ZVSD, the soft-start signal $V_{SS}$, the maximum-frequency signal $V_{FMX}$, and the switching signals $CK_0$ and $CK_A$.

The oscillator 300 is coupled to the minimum-frequency programming circuit 200, the PWM circuit 400 and the input circuit 500. The oscillator 300 receives the currents $I_X$ and $I_Y$ and the control signal $V_{COM}$ from the minimum-frequency programming circuit 200 and the input circuit 500 respectively. The oscillator 300 generates an oscillation signal CK and a signal SAW in accordance with the currents $I_X$ and $I_Y$. The oscillation signal CK and the signal SAW are modulated in accordance with the control signal $V_{COM}$ when the soft-start is completed. The signal SAW is a saw signal according to an embodiment of the present invention. The oscillation signal CK and the signal SAW are further coupled to generate the switching signals $CK_0$ and $CK_1$ through the PWM circuit 400. The PWM circuit 400 is coupled to the input circuit 500 and the oscillator 300. The PWM circuit 400 further receives the input signal $S_{FB}$, the latch signal $S_{T2}$ from the input circuit 500, and the maximum-frequency signal $V_{FMX}$ through the FMAX terminal. The PWM circuit 400 generates the switching signals $CK_0$ and $CK_1$ according to the oscillation signal CK and the maximum-frequency signal $V_{FMX}$.

The PWM circuit 400 provides the signals $CK_A$ and $CK_B$ to the input circuit 500. In other words, the PWM circuit 400 provides the switching signals $CK_0$ and $CK_1$ to the input circuit 500. The PWM circuit 400 provides a dead-time signal (not shown in FIG. 3) for the switching signals $CK_0$ and $CK_1$ at the heavy load situation and further performs the PWM operation for the light load condition.

Figure 4:
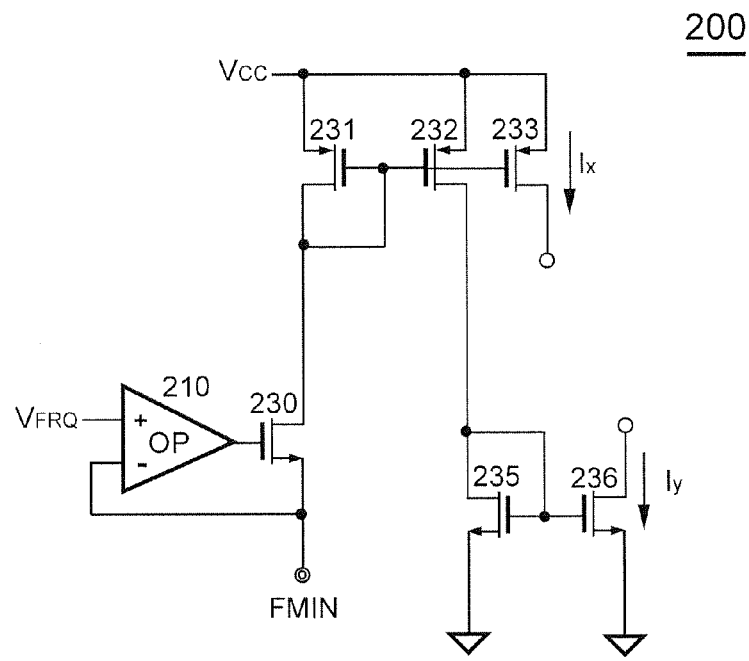
FIG. 4 shows a schematic diagram of an embodiment of the minimum-frequency programming circuit of the controller in accordance with the present invention.

FIG. 4 is a schematic diagram of an embodiment of the minimum-frequency programming circuit 200 of the controller 100 in accordance with the present invention. The minimum-frequency programming circuit 200 comprises a voltage-to-current circuit and current mirror circuits formed by transistors 231, 232, 233, 235, and 236. The voltage-to-current circuit comprises an amplifier 210 and a transistor 230. A positive input of the amplifier 210 receives a voltage $V_{FRQ}$. An output terminal of the amplifier 210 is coupled to a gate terminal of the transistor 230 to control the transistor 230. A drain terminal of the transistor 230 is coupled to the current mirror circuits. A source terminal of the transistor 230 is coupled to a negative input of the amplifier 210 and one terminal of the resistor 71 (as shown in FIG. 1) through the FMIN terminal of the controller 100 (as shown in FIG. 1).

A supply voltage $V_{CC}$ is supplied to source terminals of the transistors 231, 232 and 233. Gate terminals of the transistors 231, 232 and 233 are coupled together. A drain terminal of the transistor 231 is coupled to the drain terminal of the transistor 230 and gate terminals of the transistors 231, 232 and 233. A drain terminal of the transistor 233 is coupled to the oscillator 300 and generates the current $I_X$. The oscillator 300 is shown in FIG. 3. A drain terminal of the transistor 232 is coupled to a drain terminal of the transistor 235 and gate terminals of the transistors 235 and 236. Gate terminals of the transistors 235 and 236 are coupled together. Source terminals of the transistors 235 and 236 are coupled to the ground. A drain terminal of the transistor 236 is coupled to the oscillator 300 and generates the current $I_Y$. That is to say, the impedance of the resistor 71 and the voltage $V_{FRQ}$ determine the amplitude of the currents $I_X$ and $I_Y$.

Figure 5:
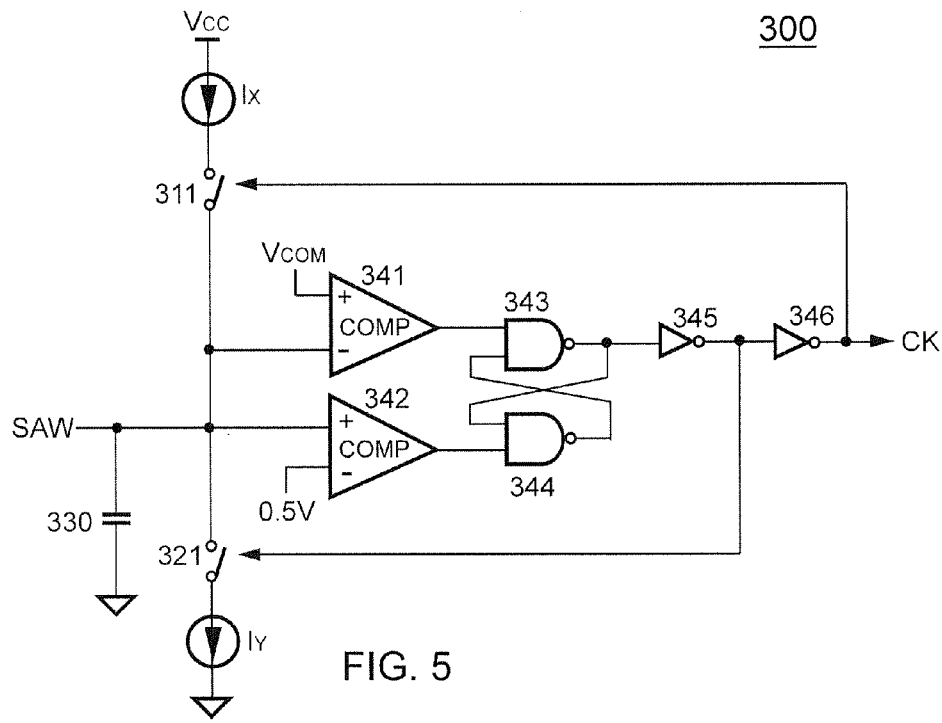
FIG. 5 shows a schematic diagram of an embodiment of the oscillator of the controller in accordance with the present invention.

FIG. 5 is a schematic diagram of an embodiment of the oscillator 300 of the controller 100 in accordance with the present invention. The oscillator 300 comprises the current $I_X$, a charge switch 311, the current $I_Y$, a discharge switch 321, and a capacitor 330. The currents $I_X$ and $I_Y$ serve as the current source. One terminal of the current $I_X$ is coupled to the supply voltage $V_{CC}$. One terminal of the charge switch 311 is coupled to other terminal of current $I_X$, the other terminal of the charge switch 311 is coupled to one terminal of the capacitor 330 and one terminal of the discharge switch 321. The other terminal of the capacitor 330 is coupled to the ground. The capacitor 330 is charged by the current $I_X$ through the charge switch 311. In other words, the charge switch 311 is utilized to control the charge of the capacitor 330. The other terminal of the discharge switch 321 is coupled to one terminal of the current $I_Y$. The other terminal of the current $I_Y$ is coupled to the ground. Hence, the capacitor 330 is discharged by the current $I_Y$ through the discharge switch 321. In other words, the discharge switch 321 is utilized to control the discharge of the capacitor 330. The signal SAW is therefore produced on the capacitor 330.

The control signal $V_{COM}$ operates as the trip-point voltage of the oscillator 300 (voltage controlled oscillator; VCO). The currents $I_X$, $I_Y$, the control signal $V_{COM}$ and the capacitance of the capacitor 330 determine the frequency of the oscillation signal CK and the signal SAW.

The oscillator 300 further comprises comparators 341 and 342, NAND gates 343 and 344, inverters 345 and 346 for generating the oscillation signal CK. Positive input and negative input of the comparator 341 are coupled to receive the control signal $V_{COM}$ and the signal SAW, respectively, to compare the control signal $V_{COM}$ with the signal SAW. Positive input and negative input of the comparator 342 are coupled to receive the signal SAW and a voltage (such as 0.5V), respectively, to compare the signal SAW with the voltage. One input terminal of the NAND gate 343 is coupled to an output terminal of the comparator 341. An output terminal of the NAND gate 344 is coupled to the other input terminal of the NAND gate 343. One input terminal of the NAND gate 344 is coupled to an output terminal of the comparator 342. The other input terminal of the NAND gate 344, an output terminal of the NAND gate 343 and an input terminal of the inverter 345 are coupled together.

An output terminal of the inverter 345 is coupled to an input terminal of inverter 346 and a control terminal of the discharge switch 321, and the discharge switch 321 is thus controlled by an output signal of the inverter 345. An output terminal of the inverter 346 is coupled to a control terminal of the charge switch 311 and the PWM circuit 400 (as shown in FIG. 3). The oscillation signal CK is generated at the output terminal of the inverter 346. That is to say, the charge switch 311 is controlled by the oscillation signal CK. Further, the control signal $V_{COM}$ is used for modulating the oscillation signal CK and the signal SAW.

Figure 6:
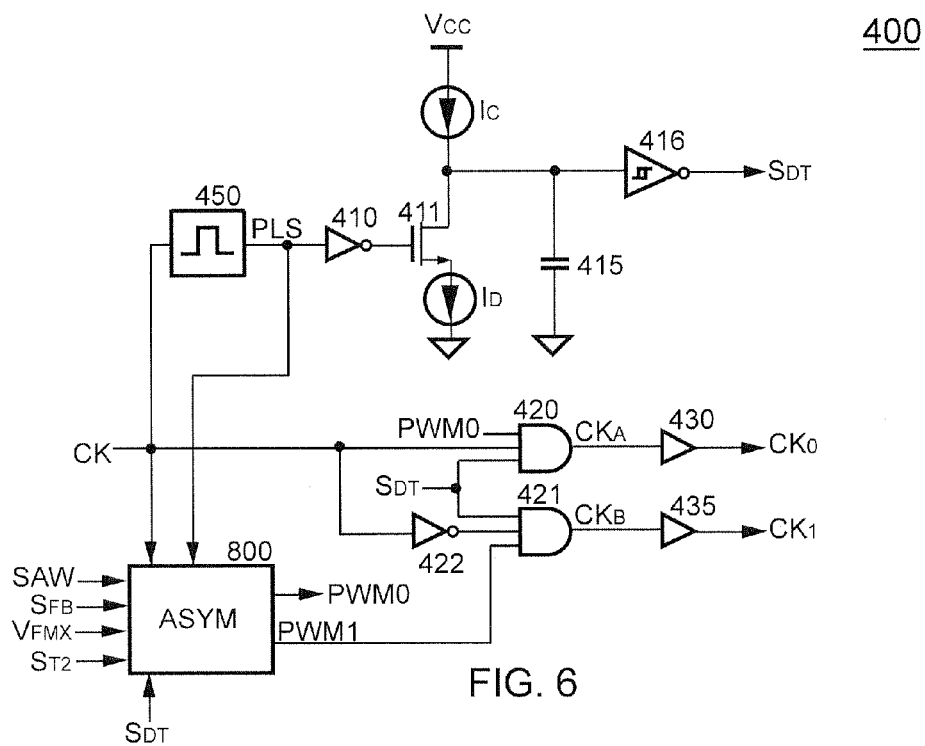
FIG. 6 shows a schematic diagram of an embodiment of the PWM circuit of the controller in accordance with the present invention.

FIG. 6 shows a schematic diagram of an embodiment of the PWM circuit 400 of the controller 100 in accordance with the present invention. The PWM circuit 400 comprises a pulse generator 450, a blanking-time circuit, an asymmetrical-PWM circuit 800 (ASYM), and a clock adjustment circuit. The pulse generator 450 receives the oscillation signal CK generated by the oscillator 300 (as shown in FIG. 5). The pulse generator 450 generates a pulse signal PLS in response to the rising edge and the falling edge of the oscillation signal CK.

A charge current source $I_C$, a discharge current source $I_D$, a capacitor 415, a transistor 411, and inverters 410, 416 form the blanking-time circuit. An input terminal of the inverter 410 is coupled to the pulse generator 450 and receives the pulse signal PLS. An output terminal of the inverter 410 is coupled to a gate terminal of the transistor 411 to drive the transistor 411. One terminal of the charge current source $I_C$ is coupled to the supply voltage $V_{CC}$. The other terminal of the charge current source $I_C$ is coupled to a drain terminal of the transistor 411, one terminal of the capacitor 415 and an input terminal of the inverter 416. A source terminal of the transistor 411 is coupled to one terminal of the discharge current source $I_D$. The other terminal of the discharge current source $I_D$ and the other terminal of the capacitor 415 are coupled to the ground.

The capacitor 415 is charged by the charge current source $I_C$ when the transistor 411 is turned off. A dead-time signal $S_{DT}$ is generated at an output terminal of the inverter 416. In other words, the pulse signal PLS and the oscillation signal CK are connected to the blanking-time circuit for producing the dead-time signal $S_{DT}$. The pulse signal PLS is generated in response to the rising edge and the falling edge of the oscillation signal CK. The dead-time signal $S_{DT}$ is generated (logical high level) after a delay time of the pulse signal PLS disabled (logic low level). The discharge current of the discharge current source $I_D$ and the capacitance of the capacitor 415 determine the delay time.

AND gates 420 and 421, an inverter 422, and buffers 430 and 435 form the clock adjustment circuit. The clock adjustment circuit receives the oscillation signal CK, signals PWM0 and PWM1 generated by the asymmetrical-PWM circuit 800, and the dead-time signal $S_{DT}$ generated by the blanking-time circuit. The AND gate 420 receives the oscillation signal CK from the oscillator 300 (as shown in FIG. 5), the dead-time signal $S_{DT}$ from the blanking-time circuit, and the signal PWM0 from the asymmetrical-PWM circuit 800. An input terminal of the butter 430 is coupled to an output terminal of the AND gate 420 for receiving the signal $CK_A$ generated by the AND gate 420. The switching signal $CK_0$ is generated at an output terminal of the butter 430. That is to say, the signal $CK_A$ is correlated to the switching signal $CK_0$.

The AND gate 421 receives the oscillation signal CK through the inverter 422, the dead-time signal $S_{DT}$ from the blanking-time circuit, and the signal PWM1 from the asymmetrical-PWM circuit 800. An input terminal of the butter 435 is coupled to an output terminal of the AND gate 421 for receiving the signal $CK_B$ generated by the AND gate 421. The switching signal $CK_1$ is generated at an output terminal of the butter 435. That is to say, the signal $CK_B$ is correlated to the switching signal $CK_1$. In other words, the signal PWM0 is connected to the AND gate 420, and the signal PWM1 is connected to the AND gate 421 for generating the signals $CK_A$ and $CK_B$. The signal $CK_A$ is coupled to generate the switching signal $CK_0$ through the buffer 430. The signal $CK_B$ is coupled to generate the switching signal $CK_1$ through the buffer 435. The dead-time signal $S_{DT}$ is generated for the switching signals $CK_0$ and $CK_1$ at the heavy load situation.

The asymmetrical-PWM circuit 800 generates the signals PWM0 and PWM1 in accordance with the input signal $S_{FB}$, the maximum-frequency signal $V_{FMX}$, the oscillation signal CK, the signal SAW, and the latch signal $S_{12}$. The asymmetrical-PWM circuit 800 future receives the plus signal PLS for generating the signal PWM1. The asymmetrical-PWM circuit 800 future receives the dead-time signal $S_{DT}$ for generating the signal PWM0.

Figure 7:
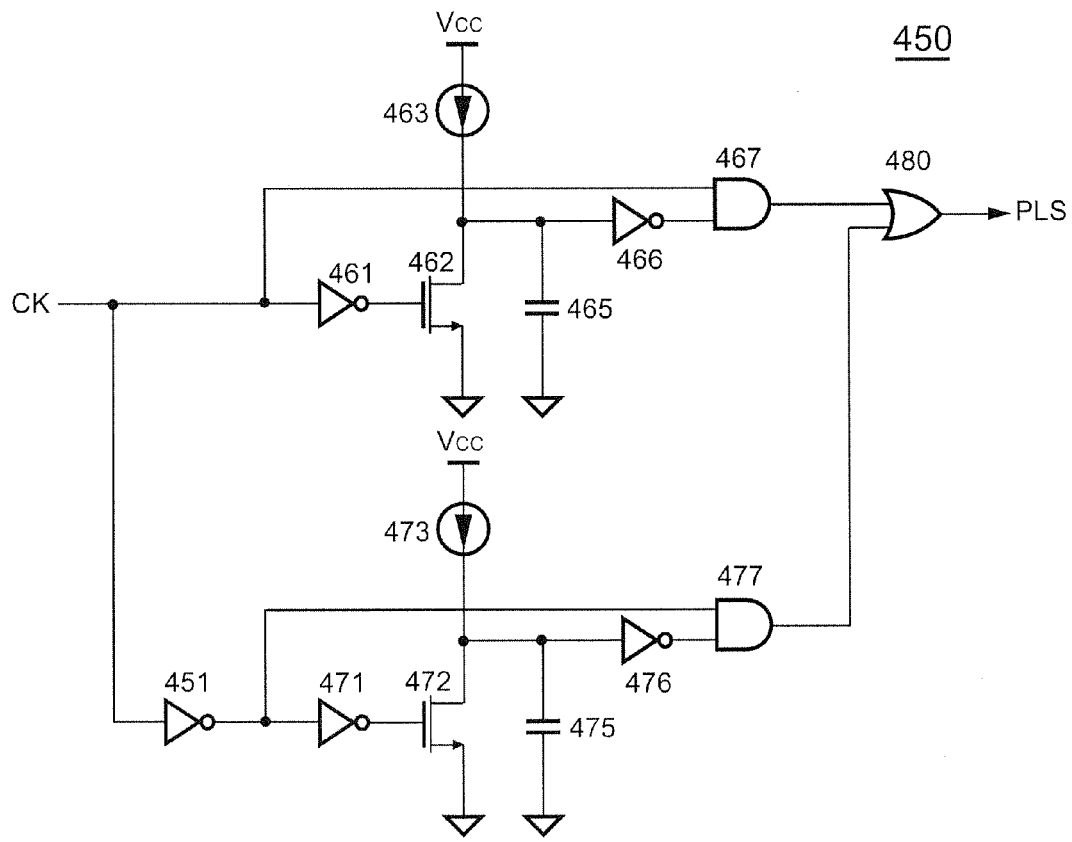
FIG. 7 shows a schematic diagram of an embodiment of the pulse generator of the PWM circuit of the controller in accordance with the present invention.

FIG. 7 shows a schematic diagram of an embodiment of the pulse generator 450 of the PWM circuit 400 of the controller 100 in accordance with the present invention. The pulse generator 450 comprises inverters 461, 466, 451, 471 and 476, current sources 463 and 473, transistors 462 and 472, capacitors 465 and 475, AND gates 467 and 477, and an OR gate 480. An input terminal of the inverter 461 is coupled to the oscillator 300 (as shown in FIG. 5) and receives the oscillation signal CK. An output terminal of the inverter 461 is coupled to a gate terminal of the transistor 462 to drive the transistor 462. One terminal of the current source 463 is coupled to the supply voltage $V_{CC}$. The other terminal of the current source 463 is coupled to a drain terminal of the transistor 462, one terminal of the capacitor 465 and an input terminal of the inverter 466. A source terminal of the transistor 462 and the other terminal of the capacitor 465 are coupled to the ground. The capacitor 465 is charged by the current source 463 when the transistor 462 is turned off. An output terminal of the inverter 466 is coupled to one input terminal of the AND gate 467. The other input terminal of the AND gate 467 is coupled to the oscillator 300 for receiving the oscillation signal CK.

An input terminal of the inverter 451 is coupled to the oscillator 300 and receives the oscillation signal CK. An output terminal of the inverter 451 is coupled to an input terminal of the inverter 471. An output terminal of the inverter 471 is coupled to a gate terminal of the transistor 472 to drive the transistor 472. One terminal of the current source 473 is coupled to the supply voltage $V_{CC}$. The other terminal of the current source 473 is coupled to a drain terminal of the transistor 472, one terminal of the capacitor 475 and an input terminal of the inverter 476. A source terminal of the transistor 472 and the other terminal of the capacitor 475 are coupled to the ground. The capacitor 475 is charged by the current source 473 when the transistor 472 is turned off. An output terminal of the inverter 476 is coupled to one input terminal of the AND gate 477. The other input terminal of the AND gate 477 is coupled to the output terminal of the inverter 451. Input terminals of the OR gate 480 are coupled to output terminals of the AND gates 467 and 477.

The pulse signal PLS is generated at an output terminal of the OR gate 480. Thus, the pulse generator 450 generates the pulse signal PLS in response to the rising edge and falling edge of the oscillation signal CK.

Figure 8:
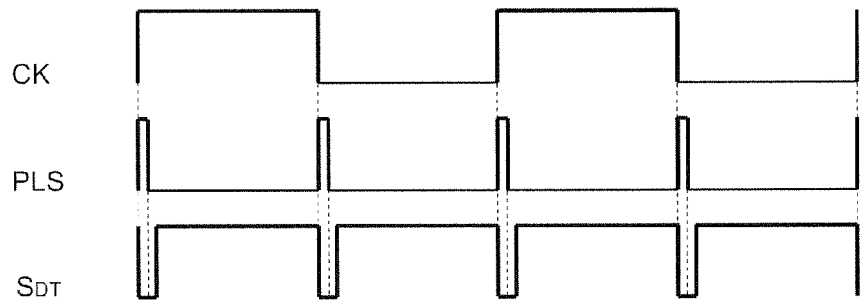
FIG. 8 shows waveforms of an oscillation signal CK, a pulse signal PLS and a dead-time signal $S_{DT}$ of the PWM circuit in accordance with the present invention.

FIG. 8 shows waveforms of the oscillation signal CK, the pulse signal PLS and the dead-time signal $S_{DT}$. The pulse signal PLS is generated (logic high level) in response to the rising edge and falling edge of the oscillation signal CK. The dead-time signal $S_{DT}$ is generated (logic high level) after the delay time of the pulse signal PLS disabled (logic low level).

Figure 9:
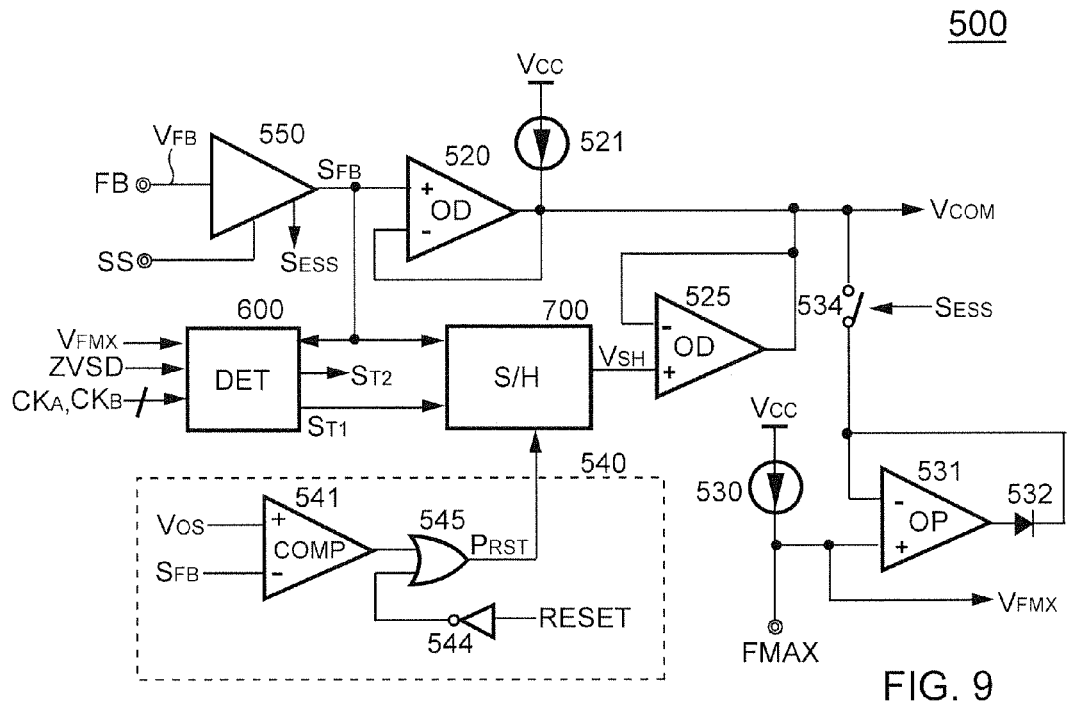
FIG. 9 shows a schematic diagram of an embodiment of the input circuit of the controller according to the present invention.

FIG. 9 is a schematic diagram of an embodiment of the input circuit 500 of the controller 100 according to the present invention. The input circuit 500 is formed by a feedback-input circuit 550, a detection circuit (DET) 600, a minimum-frequency-clamp circuit, and a maximum-frequency-clamp circuit. The feedback-input circuit 550 is coupled to the soft-start terminal SS and the feedback terminal FB for generating the input signal $S_{FB}$ and an end-soft-start signal $S_{ESS}$. The input signal $S_{FB}$ is correlated to the feedback signal $V_{FB}$.

The minimum-frequency-clamp circuit is developed by buffer amplifiers 520, 525, a current source 521, a preset-circuit 540 and a first sample-hold circuit (S/H) 700. The buffer amplifier 520 has an open-drain-output. A positive input of the buffer amplifier 520 is coupled to an output terminal of the feedback-input circuit 550. An output terminal of the buffer amplifier 520 is coupled to a negative input of the buffer amplifier 520 and one terminal of the current source 521. The other terminal of the current source 521 receives the supply voltage $V_{CC}$. In other words, the current source 521 is connected to the output terminal of the buffer amplifier 520 for the pull high. That is to say, the buffer amplifier 520 receives the input signal $S_{FB}$ generated by the feedback-input circuit 550 for generating the control signal $V_{COM}$.

The ZVS-detection signal ZVSD and the signal $CK_B$ are coupled to the detection circuit 600 for generating latch signals $S_{T1}$ and $S_{T2}$ when a none-ZVS status is detected. The detection circuit 600 further receives the signal $CK_A$, the maximum-frequency signal $V_{FMX}$ and the input signal $S_{FB}$ for generating the latch signals $S_{T1}$ and $S_{T2}$.

The input signal $S_{FB}$ generated by the input circuit 500 is further coupled to the first sample-hold circuit 700 of the minimum-frequency-clamp circuit for clamping the maximum value of the control signal $V_{COM}$ through the buffer amplifier 525. The first sample-hold circuit 700 further receives latch signal $S_{T1}$ generated by the detection circuit 600 for generating a signal $V_{SH}$ at an output terminal of the first sample-hold circuit 700.

The buffer amplifier 525 has an open-drain-output. A positive input of the buffer amplifier 525 is coupled to the first sample-hold circuit 700 for receiving the signal $V_{SH}$. An output terminal of the buffer amplifier 525 is coupled to a negative input of the buffer amplifier 525, one terminal of the current source 521 and the output terminal of the buffer amplifier 520. Therefore, the buffer amplifier 525 receives the signal $V_{SH}$ generated by the first sample-hold circuit 700 for generating the control signal $V_{COM}$. In other words, the buffer amplifier 525 clamps the maximum value of the control signal $V_{COM}$ according with the input signal $S_{FB}$.

However, the latch signal $S_{T1}$ is coupled to sample and hold a shifted-value of the input signal $S_{FB}$ into the first sample-hold circuit 700 for generating the signal $V_{SH}$ coupled to the buffer amplifier 525. The preset-circuit 540 is used for receiving the input signal $S_{FB}$, an offset signal $V_{OS}$ and a system-reset signal RESET for generating a preset signal $P_{RST}$. The preset signal $P_{RST}$ is utilized to preset the value of the first sample-hold circuit 700 and pull high the signal $V_{SH}$.

The preset-circuit 540 includes a comparator 541, an OR gate 545 and an inverter 544. A negative input of the comparator 541 is coupled to the output terminal of the feedback-input circuit 550 for receiving the input signal $S_{FB}$. A positive input of the comparator 541 receives the offset signal $V_{OS}$. An output terminal of the comparator 541 is coupled to one input terminal of the OR gate 545. The other input terminal of the OR gate 545 is coupled to an output terminal of the inverter 544. An input terminal of the inverter 544 receives the system-reset signal RESET. An output terminal of the OR gate 545 generates the preset signal $P_{RST}$. That is to say, the preset signal $P_{RST}$ is generated to preset the first sample-hold circuit 700 once the input signal $S_{FB}$ is lower than the offset signal $V_{OS}$ or the system-reset signal RESET is generated during a power-on state of the resonant power converter.

The maximum-frequency-clamp circuit comprises a current source 530, a buffer-circuit and a switch 534. One terminal of the current source 530 is coupled to the supply voltage $V_{CC}$. The other terminal of the current source 530 is connected to the resistor 72 (as shown in FIG. 1) through the FMAX terminal of the controller 100 (as shown in FIG. 1). The current source 530 associated with the resistor 72 will generate the maximum-frequency signal $V_{FMX}$.

An operational amplifier 531 and a diode 532 develop the buffer-circuit coupled to receive the maximum-frequency signal $V_{FMX}$ for clamping the minimum value of the control signal $V_{COM}$ through the switch 534. The switch 534 is coupled between the buffer-circuit and the output terminal of the input circuit 500. The switch 534 is enabled by the end-soft-start signal $S_{ESS}$ generated by the feedback-input circuit 550. The control signal $V_{COM}$ is generated in according with the input signal $S_{FB}$ when the soft-start is finished. A positive input of the operational amplifier 531 is coupled to the current source 530 and the FMAX terminal for receiving the maximum-frequency signal $V_{FMX}$. A negative input of the operational amplifier 531 is coupled to a cathode of the diode 532 and one terminal of the switch 534. An output terminal of the operational amplifier 531 is coupled to an anode of the diode 532.

In addition, the maximum value of the control signal $V_{COM}$ is clamped by the signal $V_{SH}$ generated by the first sample-hold circuit 700 of the minimum-frequency-clamp circuit, the minimum switching frequencies of the switching signals $CK_0$ and $CK_1$ (as shown in FIG. 1) are limited to prevent the region 3 operation for achieving the ZVS. In other words, the minimum switching frequency of the resonant power converter is limited to prevent the region 3 operation.

Furthermore, the minimum value of the control signal $V_{COM}$ is clamped by the maximum-frequency signal $V_{FMX}$ generated by the maximum-frequency-clamp circuit, the maximum switching frequencies of the switching signals $CK_0$, $CK_1$ are controlled to achieve the higher efficiency at the light load of the resonant power converter.

If the input signal $S_{FB}$ further goes lower than the maximum-frequency signal $V_{FMX}$, then the PWM operation of the switching signals $CK_0$, $CK_1$ will be started. The input signal $S_{FB}$ being lower than the maximum-frequency signal $V_{FMX}$ represents the switching frequency of the resonant power converter reaches the maximum switching frequency. In other words, the PWM operation of the switching signals $CK_0$, $CK_1$ will be started once the switching frequency of the resonant power converter reaches the maximum switching frequency. The PWM operation is controlled by the latch signal $S_{12}$ generated by the detection circuit 600. That is to say, the control signal $V_{COM}$ is generated in according with the input signal $S_{FB}$, the signal $V_{SH}$ or the maximum-frequency signal $V_{FMX}$.

Figure 10:
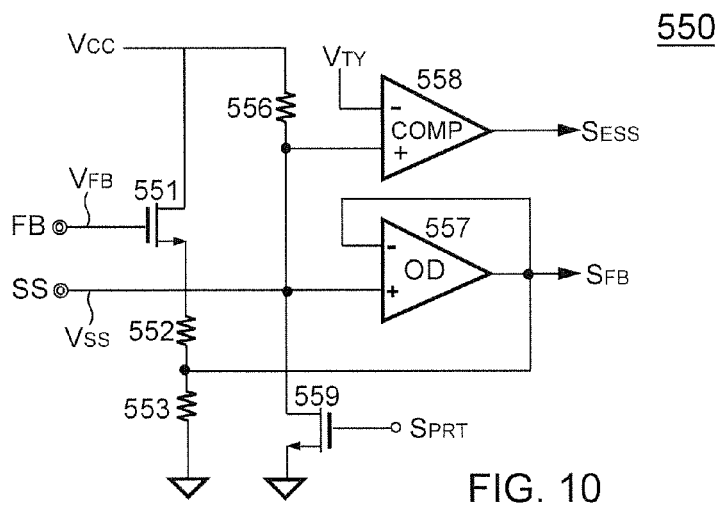
FIG. 10 shows a schematic diagram of an embodiment of the feedback-input circuit of the input circuit of the controller according to the present invention.

FIG. 10 is a schematic diagram of an embodiment of the feedback-input circuit 550 of the input circuit 500 of the controller 100 according to the present invention. The feedback-input circuit 550 comprises a level-shift circuit, a buffer 557, a resistor 556, a comparator 558 and a transistor 559. The level-shift circuit is developed by resistors 552, 553 and a transistor 551. A drain terminal of the transistor 551 is coupled to the supply voltage $V_{CC}$. A source terminal of the transistor 551 is coupled to the one terminal of the resistor 552. Resistors 552 and 553 are coupled in serial. One terminal of the resistor 553 is coupled to the ground. A gate terminal of the transistor 551 is coupled to receive the feedback signal $V_{FB}$ through the feedback terminal FB for generating the input signal $S_{FB}$. In other words, the transistor 551 is controlled by the feedback signal $V_{FB}$.

The buffer 557 has "the open-drain output". A positive input of the buffer 557 is coupled to the soft-start terminal SS and receive the soft-start signal $V_{SS}$ for the soft-start. An output terminal of the buffer 557 is coupled to a negative input of the buffer 557 and a joint of the resistors 552 and 553. The input signal $S_{FB}$ is generated at the output terminal of the buffer 557. The buffer 557 is coupled to clamp the value of the input signal $S_{FB}$ in accordance with the voltage of the soft-start signal $V_{SS}$.

One terminal of the resistor 556 is coupled to the supply voltage $V_{CC}$ and the drain terminal of the transistor 551. The other terminal of the resistor 556 is connected to the capacitor 73 (as shown in FIG. 1) through the soft-start terminal SS and a drain terminal of the transistor 559. A source terminal of the transistor 559 is coupled to the ground. A gate terminal of the transistor 559 is controlled by a signal $S_{PRT}$. Therefore, the supply voltage $V_{CC}$ charges the capacitor 73 (as shown in FIG. 1) through the resistor 556 when the transistor 559 is turned off. The signal $S_{PRT}$ controls the on/off of the transistor 559. The signal $S_{PRT}$ is enabled during the soft-start (for example, during power-on period and during the protection situation) of the power converter. That is to say, the transistor 559 is turned off and the capacitor 73 is charged by the supply voltage $V_{CC}$ when the soft-start is completed.

A negative input of the comparator 558 is coupled to a threshold $V_{TY}$. A positive input of the comparator 558 is coupled to the soft-start terminal SS for receiving the soft-start signal $V_{SS}$. An output terminal of the comparator 558 generates the end-soft-start signal $S_{ESS}$ once the soft-start signal $V_{SS}$ of the soft-start terminal SS is higher than the threshold $V_{TY}$. In addition, the value of the input signal $S_{FB}$ is correlated to the output load of the power converter because the input signal $S_{FB}$ is proportional to the feedback signal $V_{FB}$.

Figure 11:
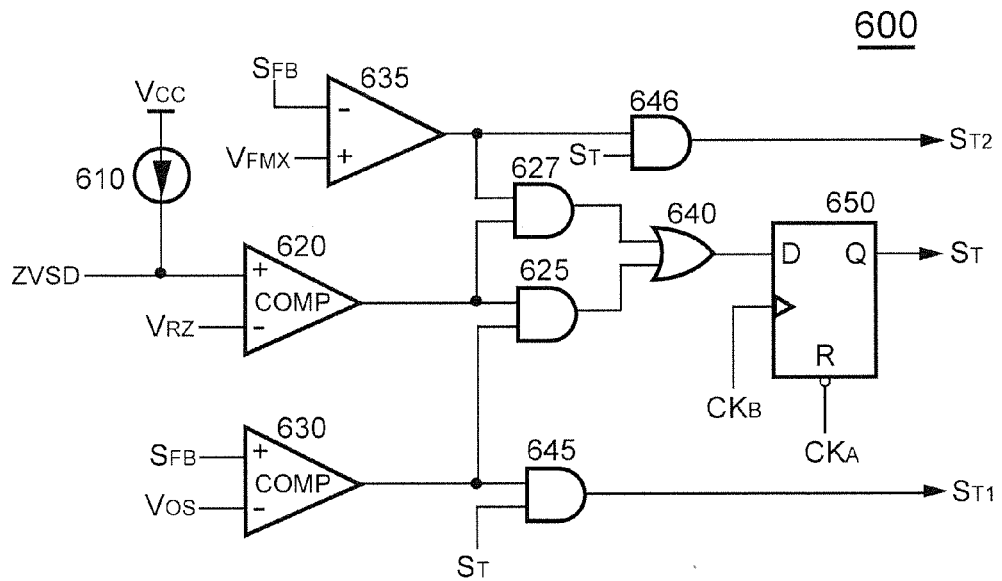
FIG. 11 shows a schematic diagram of an embodiment of the detection circuit of the input circuit of the controller according to the present invention.

FIG. 11 is schematic diagram of an embodiment of the detection circuit 600 of the input circuit 500 of the controller 100 according to the present invention. The detection circuit 600 comprises a current source 610, comparators 620, 630 and 635, AND gates 627, 625, 645 and 646, an OR gate 640, and a D-flip-flop 650. One terminal of the current source 610 is coupled to the supply voltage $V_{CC}$. The other terminal of the current source 610 is coupled to the anode of the diode 25 (as shown in FIG. 1) and a positive input of the comparator 620. That is to say, the positive input of the comparator 620 receives the ZVS-detection signal ZVSD.

A negative input of the comparator 620 is coupled to a threshold $V_{RZ}$. An output terminal of the comparator 620 will output a logic-high signal (for none-ZVS state) once the ZVS-detection signal ZVSD is higher than the threshold $V_{RZ}$. A positive input of the comparator 630 receives the input signal $S_{FB}$ generated by the feedback-input circuit 550 (as shown in FIG. 9). A negative input of the comparator 630 receives the offset signal $V_{OS}$. An output terminal of the comparator 630 will also output a logic-high signal when the input signal $S_{FB}$ is higher than the offset signal $V_{OS}$. The input signal $S_{FB}$ higher than the offset signal $V_{OS}$ signal means that the output load of the resonant power converter is heavy.

A negative input of the comparator 635 receives the input signal $S_{FB}$ generated by the feedback-input circuit 550. A positive input of the comparator 635 is coupled to the FMAX terminal of the controller 100 (as shown in FIG. 1) for receiving the maximum-frequency signal $V_{FMX}$. An output terminal of the comparator 635 will also output a logic-high signal when the input signal $S_{FB}$ is lower than the maximum-frequency signal $V_{FMX}$. The input signal $S_{FB}$ lower than the maximum-frequency signal $V_{FMX}$ means that the PWM operation is started.

Both the output terminals of the comparators 620 and 630 are connected to input terminals of the AND gate 625. The output terminals of the comparators 620 and 635 are connected to input terminals of the AND gate 627. Output terminals of the AND gates 625 and 627 are connected to input terminals of the OR gate 640. An output of the OR gate 640 is sent to a D-input terminal of the D-flip-flop 650 for generating a latch signal $S_T$. A clock-input terminal of the D-flip-flop 650 is driven by the signal $CK_B$. A reset-input terminal R of the D-flip-flop 650 is controlled by the signal $CK_A$.

The zero voltage switching (ZVS) means that the body diode of the transistor is turned on by the circulated-current of the resonant tank before the transistor is switched on by its gate drive signal, such as switching signals $CK_0$ and $CK_1$ (as shown in FIG. 1). Therefore, the latch signal $S_T$ will be generated (to indicate the none-ZVS state) if the body diode of the transistor 20 (as shown in FIG. 1) is not conducted before the transistor 20 is switched on. The output terminal of the comparator 630 and the latch signal $S_T$ are connected to input terminals of the AND gate 645 for generating the latch signal $S_{T1}$ at an output terminal of the AND gate 645. The latch signal $S_{T1}$ is utilized for limiting the minimum switching frequencies of the switching signals $CK_0$, $CK_1$ (as shown in FIG. 1) to prevent the region 3 operation. The output terminal of the comparator 635 associated with the latch signal $S_T$ for generate the latch signal $S_{T2}$ through the AND gate 646 for the PWM operation's ZVS. Input terminals of the AND gate 646 are coupled to receive the output signal generated by the comparator 635 and the latch signal $S_T$.

Figure 12:
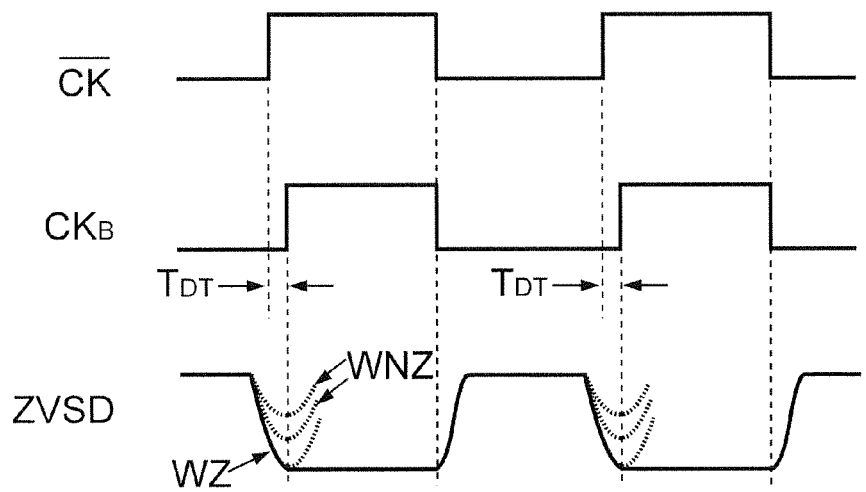
FIG. 12 shows waveforms of an inverse oscillation signal /CK, a signal $CK_B$ and a ZVS-detection signal ZVSD of the controller according to the present invention.

FIG. 12 shows the waveforms of the oscillation signal CK's inverse signal (/CK), the signal $CK_B$ and the ZVS-detection signal ZVSD of the controller 100 according to the present invention. The signal $CK_B$ is generated for a period $T_{DT}$ after the oscillation signal CK's inverse signal (/CK) is enabled. The period $T_{DT}$ is related to the dead-time signal $S_{DT}$ (as shown in FIG. 6). The WZ waveform of the ZVS-detection signal ZVSD shows the ZVS situation. The WNZ waveform of the ZVS-detection signal ZVSD shows the none-ZVS situation.

Figure 13:
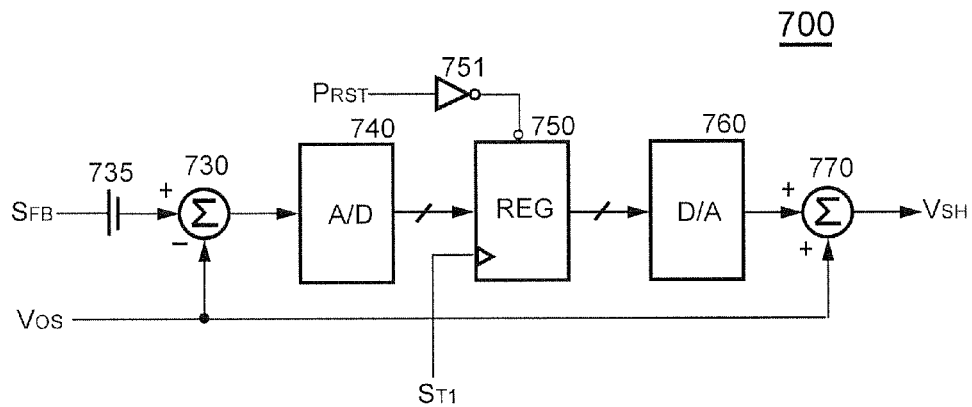
FIG. 13 shows a schematic diagram of an embodiment of the first sample-hold circuit of the input circuit of the controller in accordance with the present invention.

FIG. 13 is a schematic diagram of an embodiment of the first sample-hold circuit 700 of the input circuit 500 of the controller 100 in accordance with the present invention. The first sample-hold circuit 700 comprises a reference level 735, adder-circuits 730 and 770, an analog-to-digital converter (A/D) 740, a register (REG) 750, an inverter 751, and a digital-to-analog converter (D/A) 760. A positive terminal of the reference level 735 is coupled to the feedback-input circuit 550 (as shown in FIG. 9) for receiving the input signal $S_{FB}$. A negative terminal of the reference level 735 is coupled to a positive input of the adder-circuit 730. Therefore, the input signal $S_{FB}$ is level-shifted (decreased) by the reference level 735. The positive input of the adder-circuit 730 receives the input signal $S_{FB}$ decreased by the reference level 735. The offset signal $V_{OS}$ is coupled to a negative input of the adder-circuit 730. An output terminal of the adder-circuit 730 is connected to an input terminal of the analog-to-digital converter 740.

Consequently, the input signal $S_{FB}$ will be subtracted from the reference level 735 and the level of the offset signal $V_{OS}$, and then it is connected to the analog-to-digital converter 740 and converted into the digital signal by the analog-to-digital converter 740.

An output of the analog-to-digital converter 740 is sent to an input terminal of the register 750 coupled to the analog-to-digital converter 740. The output of the analog-to-digital converter 740 is the digital signal. The preset signal $P_{RST}$ is coupled to preset the register 750 via the inverter 751. An input terminal of the inverter 751 receives the preset signal $P_{RST}$. An output terminal of the inverter 751 is coupled to the register 750. The latch signal $S_{T1}$ is coupled to a clock-input terminal of the register 750 for latching the output of the analog-to-digital converter 740 into the register 750. An output terminal of the register 750 is connected to the digital-to-analog converter 760 for transmitting the digital signal to the digital-to-analog converter 760.

The digital-to-analog converter 760 converts the digital signal outputted by the register 750 into the analog signal. An output (the analog signal) of the digital-to-analog converter 760 is added with the offset signal $V_{OS}$ through another adder-circuit 770 for generating the signal $V_{SH}$ (the output of the first sample-hold circuit 700). The adder-circuit 770 receives the analog signal of the digital-to-analog converter 760 and the offset signal $V_{OS}$ for generating $V_{SH}$. Therefore, the analog signal of the digital-to-analog converter 760 is utilized to generate the signal $V_{SH}$ for clamping the control signal $V_{COM}$ (as shown in FIG. 9).

Figure 14:
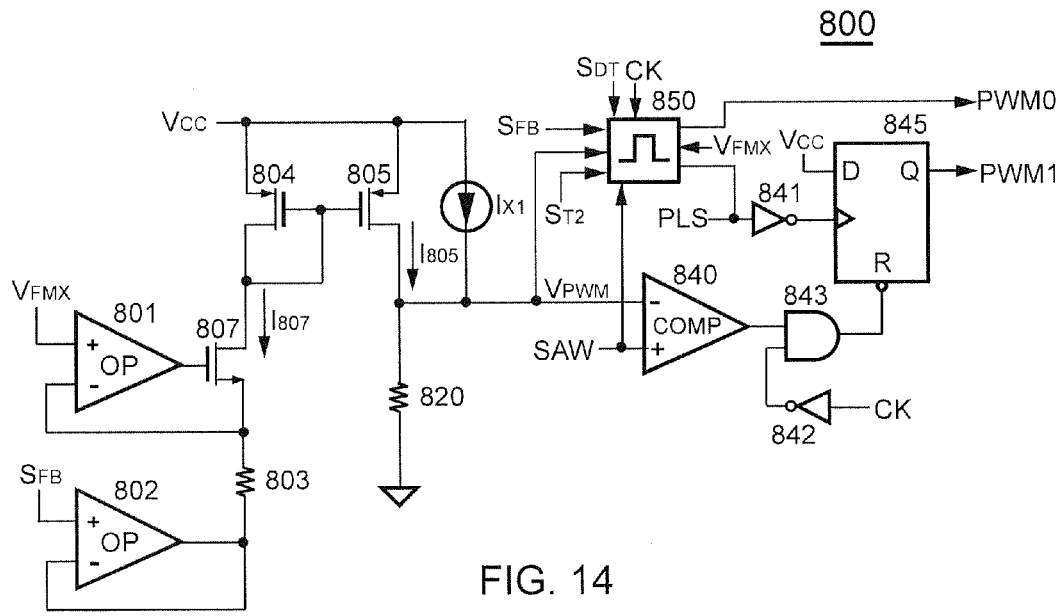
FIG. 14 shows a schematic diagram of an embodiment of the asymmetrical-PWM circuit of the PWM circuit of the controller in accordance with the present invention.

FIG. 14 is a schematic diagram of an embodiment of the asymmetrical-PWM circuit 800 of the PWM circuit 400 of the controller 100 in accordance with the present invention. The asymmetrical-PWM circuit 800 comprises a management circuit, a resistor 820, a current source $I_{X1}$, a comparator 840, an AND gate 843, inverters 841 and 842, a flip-flop 845, and a PWM unit 850. The management circuit comprises a voltage-to-current circuit and a current mirror circuit formed by transistors 804 and 805. The voltage-to-current circuit comprises operational amplifiers 801 and 802, a resistor 803, and a transistor 807.

A positive input of the operational amplifier 801 receives the maximum-frequency signal $V_{FMX}$. An output terminal of the operational amplifier 801 is coupled to a gate terminal of the transistor 807 to driver the transistor 807. A drain terminal of the transistor 807 is coupled to the current mirror circuit. A source terminal of the transistor 807 is coupled to a negative input of the operational amplifier 801 and one terminal of the resistor 803. The other terminal of the resistor 803 is coupled to a negative input of the operational amplifier 802 and an output terminal of the operational amplifier 802. Therefore, the negative input of the operational amplifier 802 and the output terminal of the operational amplifier 802 are coupled together. The input signal $S_{FB}$ is supplied to a positive input of the operational amplifier 802.

The voltage-to-current circuit is utilized to generate a current $I_{807}$ once the value of the input signal $S_{FB}$ is lower than the value of the maximum-frequency signal $V_{FMX}$. The current $I_{807}$ is generated at the drain terminal of the transistor 807. The current $I_{807}$ can be expressed by, $$I_{807}=(V_{FMX}-S_{FB})/R_{803}$$

Wherein the $R_{803}$ is the resistance of the resistor 803. Because the maximum-frequency signal $V_{FMX}$ and the resistance of the resistor 803 are constant value, and therefore the current $I_{807}$ is determined by the input signal $S_{FB}$.

The supply voltage $V_{CC}$ is supplied to source terminals of the transistors 804 and 805. Gate terminals of the transistors 804 and 805 are coupled together. A drain terminal of the transistor 804 is coupled to the drain terminal of the transistor 807 and gate terminals of the transistors 804 and 805. Therefore, the current mirror circuit developed by the transistors 804 and 805 receives the current $I_{807}$ to generate a current $I_{805}$ at a drain terminal of the transistor 805. That is to say, the current $I_{805}$ is generated once the value of the input signal $S_{FS}$ is lower than the value of the maximum-frequency signal $V_{FMX}$ because the current $I_{805}$ is correlated to the current $I_{807}$. In other words, the management circuit is utilized to enable the current $I_{805}$ once the value of the input signal $S_{FB}$ is lower than the value of the maximum-frequency signal $V_{FMX}$. On the other hands, the management circuit disables the current $I_{805}$ once the value of the input signal $S_{FB}$ is higher than the value of the maximum-frequency signal $V_{FMX}$.

As mentioned above, since the maximum-frequency signal $V_{FMX}$ is a constant, the current $I_{805}$ is produced in response to the value of the input signal $S_{FB}$. In other words, the current $I_{805}$ is produced in response to the value of the feedback signal $V_{FB}$ (as shown in FIG. 1). That is to say, the management circuit generates the current $I_{805}$ at the transistor 805 in accordance with the level of the input signal $S_{FB}$ and the maximum-frequency signal $V_{FMX}$. In addition, the value of the input signal $S_{FB}$ is correlated to the output load of the resonant power converter because the input signal $S_{FB}$ is proportional to the feedback signal $V_{FB}$.

The supply voltage $V_{CC}$ further is supplied to one terminal of the current source $I_{X1}$. The other terminal of the current source $I_{X1}$ is coupled to the drain terminal of the transistor 805 and one terminal of the resistor 820. The other terminal of the resistor 820 is coupled to the ground. The current source $I_{X1}$ associated with the current $I_{805}$ generates a signal $V_{PWM}$ at the resistor 820. The current $I_{805}$ and the signal $V_{PWM}$ can be expressed by, $$I_{805} = \frac{V_{FMX} - S_{FB}}{R_{803}} \times K \quad (1)$$

$$V_{PWM}=(I_{X1}+I_{805})\times R_{820} \quad (2)$$

Wherein the K value is the ratio of the current mirror developed by the transistors 804 and 805. $R_{820}$ and $R_{803}$ are the resistance of the resistors 820 and 803 respectively. Referring to equations (1) and (2), the signal $V_{PWM}$ can be rewritten as, $$V_{PWM} = \left[I_{X1} + \left(\frac{V_{FMX} - S_{FB}}{R_{803}} \times K\right)\right] \times R_{820}$$

The current source $I_{X1}$ determines a minimum pulse width of the signals PWM0 and PWM1 when the value of the input signal $S_{FB}$ is higher than the value of the maximum-frequency signal $V_{FMX}$ and the management circuit disables the current $I_{805}$. The signal $V_{PWM}$ is correlated to the input signal $S_{FB}$. Therefore, the signal $V_{PWM}$ is correlated to the feedback signal $V_{FB}$ (as shown in FIG. 1).

A negative input of the comparator 840 is coupled to the resistor 820 for receiving the signal $V_{PWM}$. A positive input of the comparator 840 is coupled to the oscillator 300 (as shown in FIG. 5) for receiving the signal SAW. An output terminal of comparator 840 will output a logic-low signal when the signal $V_{PWM}$ is higher than the signal SAW. One input terminal of the AND gate 843 is coupled to the output terminal of the comparator 840. The other input terminal of the AND gate 843 receives the oscillation signal CK through the inverter 842. An output terminal of the AND gate 843 is coupled to a reset-input terminal R of the flip-flop 845 to turn off an output (signal PWM1) of the flip-flop 845. Via the inverter 841, a clock-input terminal of the flip-flop 845 receives the pulse signal PLS to driver the flip-flop 845. The pulse signal PLS is generated by the pulse generator 450 (as shown in FIG. 6). The supply voltage $V_{CC}$ is supplied to an input terminal D of the flip-flop 845. An output terminal Q of the flip-flop 845 generates the signal PWM1.

As mentioned above, the signal PWM1 is generated and turned-on by the flip-flop 845 in response to the falling edge of the pulse signal PLS. The signal PWM1 is turned-off by the comparator 840 once the signal $V_{PWM}$ is higher than the signal SAW. Furthermore, the PWM1 signal is reset when the oscillation signal CK is logic high. If the input signal $S_{FB}$ is higher than the maximum-frequency signal $V_{FMX}$, then the signal $V_{PWM}$ is in a low state and the signal PWM1 will be the maximum duty cycle. When the input signal $S_{FB}$ is lower than the maximum-frequency signal $V_{FMX}$ during the light load, the pulse width of the signal PWM1 is decreased in response to the increase of the signal $V_{PWM}$.

The signal $V_{PWM}$ is further coupled to the PWM unit 850 to generate the signal PWM0. The PWM unit 850 receives the oscillation signal CK, the pulse signal PLS, the input signal $S_{FB}$, the signal $V_{PWM}$, the signal SAW, the latch signal $S_{T2}$ generated by the detection circuit 600 (as shown in FIG. 9), the dead-time signal $S_{DT}$ generated by the PWM circuit 400 (as shown in FIG. 6), and the maximum-frequency signal $V_{FMX}$ for generating the signal PWM0.

Figure 15:
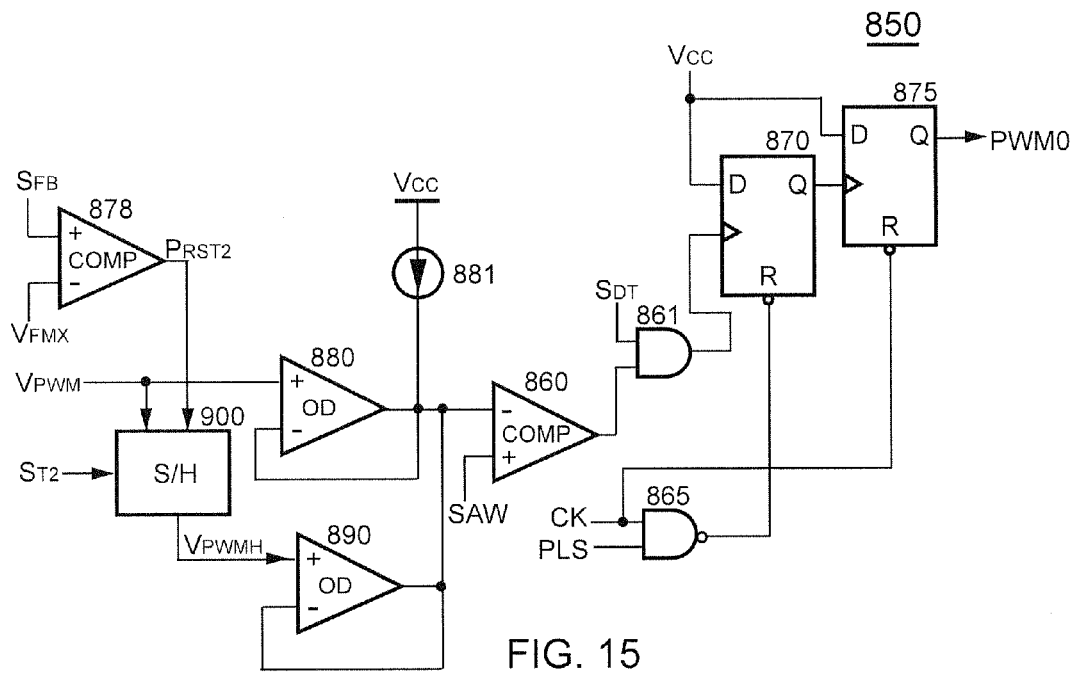
FIG. 15 shows a schematic diagram of an embodiment of the PWM unit of the asymmetrical-PWM circuit of the PWM circuit of the controller in accordance with the present invention.

FIG. 15 is a schematic diagram of an embodiment of the PWM unit 850 of the asymmetrical-PWM circuit 800 of the PWM circuit 400 of the controller 100 in accordance with the present invention. The PWM unit 850 comprises a PWM-clamp circuit, a comparator 860, an AND gate 861, flip-flops 870 and 875, and a NAND gate 865. The PWM-clamp circuit is developed by buffer amplifiers 880, 890, a current source 881, a second sample-hold circuit (S/H) 900 and a comparator 878. The buffer amplifier 880 has an open-drain output. A positive input of the buffer amplifier 880 is coupled to the resistor 820 (as shown in FIG. 14) to receive the signal $V_{PWM}$. An output terminal of the buffer amplifier 880 is coupled to a negative input of the buffer amplifier 880, one terminal of the current source 881 and an output terminal of the buffer amplifier 890. The other terminal of the current source 881 receives the supply voltage $V_{CC}$. The current source 881 is used for the pull-high. In other words, the current source 881 is connected to the output terminal of the buffer amplifier 880 for the pull-high. Addition, the open-drain buffer amplifier 890 is coupled to clamp the output level of the buffer amplifier 880.

A negative input of the comparator 878 is coupled to the FMAX terminal of the controller 100 (as shown in FIG. 1) for receiving the maximum-frequency signal $V_{FMX}$. A positive input of the comparator 878 is coupled to the output terminal of the feedback-input circuit 550 (as shown in FIG. 9) to receive the input signal $S_{FB}$. An output terminal of the comparator 878 generates a preset signal $P_{RST2}$. In other words, the comparator 878 will output the preset signal $P_{RST2}$ to preset the second sample-hold circuit 900 once the input signal $S_{FB}$ is higher the maximum-frequency signal $V_{FMX}$.

A signal $V_{PWMH}$ is generated by the second sample-hold circuit 900 in accordance with the signal $V_{PWM}$, the latch signal $S_{T2}$ and the preset signal $P_{RST2}$. The signal $V_{PWM}$ will be sampled and held by the second sample-hold circuit 900 when the latch signal $S_{T2}$ is enabled (none-ZVS state). The signal $V_{PWMH}$ is thus outputted (with a level-shift) to clamp a maximum level that can achieve the ZVS for the switching of the transistor 20 (as shown in FIG. 1) during the PWM operation.

The second sample-hold circuit 900 of the PWM-clamp circuit clamps the level of the signal $V_{PWMH}$ to limit a minimum pulse width of the signal PWM0 when the input signal $S_{FB}$ is lower than the maximum-frequency signal $V_{FMX}$. Therefore, the signal $V_{PWMH}$ serves as a second control signal. The control signal $V_{COM}$ is the first control signal. The signal $V_{PWMH}$ is correlated to the signal $V_{PWM}$. Therefore, the signal $V_{PWMH}$ is correlated to the feedback signal $V_{FB}$ (as shown in FIG. 1) due to the signal $V_{PWM}$ is correlated to the feedback signal $V_{FB}$.

A positive input of the buffer amplifier 890 is coupled to the second sample-hold circuit 900 to receive the signal $V_{PWMH}$. The output terminal of the buffer amplifier 890 is coupled to a negative input of the buffer amplifier 890, one terminal of the current source 881 and the output terminal of the buffer amplifier 880. The output of the buffer amplifier 890 is controlled by the signal $V_{PWMH}$. A negative input of the comparator 860 is coupled to the output terminals of the buffer amplifiers 880 and 890 and one terminal of the current source 881 for receiving the signal $V_{PWM}$ or the signal $V_{PWMH}$. A positive input of the comparator 860 is coupled to the oscillator 300 (as shown in FIG. 5) for receiving the signal SAW. An output terminal of the comparator 860 will output a logic-low signal when the signal $V_{PWM}$ or the signal $V_{PWMH}$ is higher than the signal SAW.

The signal $V_{PWM}$ is coupled to the comparator 860 via the buffer amplifier 880. In addition, the signal $V_{PWMH}$ is coupled to the comparator 860 via the buffer amplifier 890. The comparator 860 will output a logic high signal once the signal $V_{PWM}$ or the signal $V_{PWMH}$ is lower than the signal SAW. One input terminal of the AND gate 861 is coupled to an output terminal of the comparator 860. The other input terminal of the AND gate 861 is coupled to the PWM circuit 400 (as shown in FIG. 6) to receive the dead-time signal $S_{DT}$. An output terminal of the AND gate 861 is coupled to a clock-input terminal of the flip-flop 870. That is to say, the output of the comparator 860 and the dead-time signal $S_{DT}$ are coupled to clock and enable the flip-flop 870 through the AND gate 861.

The supply voltage $V_{CC}$ is supplied to input terminals D of the flip-flops 870 and 875. An output terminal Q of the flip-flop 870 is coupled to a clock-input terminal of the flip-flop 875. An output terminal Q of the flip-flop 875 generates the signal PWM0. In other words, the output of the flip-flop 870 is connected to clock and enable the flip-flop 875 for generating the signal PWM0. A reset-input terminal R of the flip-flop 875 is coupled to the oscillator 300 (as shown in FIG. 5) to receive the oscillation signal CK. That is to say, the oscillation signal CK is connected to reset the flip-flop 875.

The input terminals of the NAND gate 865 are coupled to the oscillator 300 and the pulse generator 450 (as shown in FIG. 6) to receive the oscillation signal CK and the pulse signal PLS. An output terminal of the NAND gate 865 is coupled to a reset-input terminal R of the flip-flop 870 to turn off the output of the flip-flop 870. To put it differently, the oscillation signal CK and the pulse signal PLS are coupled to reset the flip-flop 870 via the NAND gate 865. Therefore, the PWM0 signal can be controlled and turned-on cycle-by-cycle when the signal $V_{PWM}$ or the signal $V_{PWMH}$ is lower than the signal SAW. The PWM0 signal is turned-off in response to the enable of the oscillation signal CK.

Figure 16:
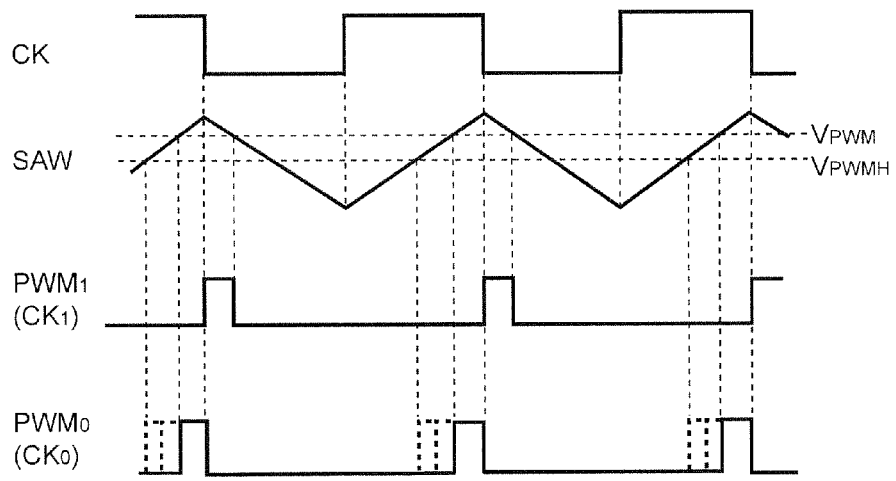
FIG. 16 shows waveforms of the oscillation signal CK, a signal SAW, and the pulse-width modulation of the signals PWM0, PWM1 of the PWM circuit of the controller in accordance with the present invention.

FIG. 16 shows the waveforms of the oscillation signal CK, the signal SAW, and the pulse-width modulation of the signals PWM0 and PWM1 of the PWM circuit 400 of the controller 100 in accordance with the present invention. The pulse-width of the signal PWM1 is modulated in accordance with the comparison of the signals SAW and $V_{PWM}$ (referring to FIG. 14). The pulse-width of the signal PWM0 is modulated in accordance with the comparison of the signals SAW and $V_{PWM}$ (or the signal $V_{PWMH}$). Therefore, the first switching signal $CK_0$ and the second switching signal $CK_1$ are modulated to achieve the ZVS for the transistor 20 (as shown in FIG. 1). The level of the signal $V_{PWMH}$ would be clamped by the second sample-hold circuit 900 of the PWM-clamp circuit (as shown in FIG. 15) to ensure the minimum pulse width of the signal PWM0. This minimum pulse width of the signal PWM0 will achieve the ZVS for the switching of the transistor 20. Because the pulse width of the first switching signal $CK_0$ is correlated to the pulse width of the signal PWM0, the minimum pulse width of the first switching signal $CK_0$ is limited by the second sample-hold circuit 900 of the PWM-clamp circuit for achieving the ZVS for the transistor 20.

For preventing the none-linear operation, the region 3 operation should be avoided. Because the maximum power transfer and the maximum efficiency can be realized for the switching frequency operated at resonant frequency, the design of the present invention allows the switching frequency operated closely to the resonant frequency of the resonant power converter and prevents the region 3 operation, that is the object of the present invention.

Although the present invention and the advantages thereof have been described in detail, it should be understood that various changes, substitutions, and alternations can be made therein without departing from the spirit and scope of the invention as defined by the appended claims. That is, the discussion included in this invention is intended to serve as a basic description. It should be understood that the specific discussion may not explicitly describe all embodiments possible; many alternatives are implicit. The generic nature of the invention may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

What is claimed is:

1. A control circuit of a resonant power converter, comprising:
    a first transistor, switching a transformer through a resonant tank;
    a second transistor, switching the transformer through the resonant tank;
    a controller, coupled to receive a feedback signal for generating a first switching signal and a second switching signal coupled to drive the first transistor and the second transistor respectively; in which the feedback signal is correlated to an output of the resonant power converter; and
    a diode, coupled to the second transistor for detecting the state of the second transistor for the controller;
    wherein the first switching signal and the second switching signal are modulated to achieve a zero voltage switching (ZVS) for the second transistor.

2. The control circuit as claimed in claim 1, further comprising
    a resistor, connected to the controller to determine a maximum switching frequency.

3. The control circuit as claimed in claim 1, wherein the controller comprises:
    an input circuit, generating a control signal according to the feedback signal, a maximum-frequency signal, and the state of the second transistor;
    an oscillator, generating an oscillation signal according to the control signal; and
    a PWM circuit, generating the first switching signal and the second switching signal according to the oscillation signal and the maximum-frequency signal.

4. The control circuit as claimed in claim 1, wherein a pulse-width modulation (PWM) of the first switching signal and the second switching signal will be started once the switching frequency of the resonant power converter reaches a maximum switching frequency.

5. The control circuit as claimed in claim 1, wherein a minimum pulse-width of the first switching signal will be limited by a PWM-clamp circuit for achieving the ZVS of the second transistor.

6. The control circuit as claimed in claim 1, wherein a minimum switching frequency of the first switching signal and the second switching signal will be limited by a minimum-frequency-clamp circuit for achieving the ZVS of the first transistor and the second transistor.

7. The control circuit as claimed in claim 1, wherein the controller comprises a first sample-hold circuit to clamp a first control signal for limiting a minimum switching frequency; the first control signal is related to the feedback signal.

8. The control circuit as claimed in claim 7, wherein the first sample-hold circuit comprises:
    an analog-to-digital converter, converting a signal into a digital signal;
    a register, coupled to the analog-to-digital converter and latching the digital signal of the analog-to-digital converter into the register; and
    a digital-to-analog converter, connected to the register and converting the digital signal outputted by the register into an analog signal, in which the analog signal is utilized to clamp the first control signal.

9. The control circuit as claimed in claim 1, wherein the controller comprises a second sample-hold circuit to clamp a second control signal for limiting a minimum pulse width of the first switching signal; the second control signal is related to the feedback signal.

10. A method for controlling a resonant power converter comprising:
    receiving a feedback signal for generating a switching signal;
    switching a transformer and a resonant tank through a transistor;
    detecting the state of the transistor for zero voltage switching (ZVS); and
    limiting a minimum switching frequency of the transistor for achieving the ZVS;
    wherein the transistor is driven by the switching signal; the feedback signal is correlated to an output of the resonant power converter.

11. The method as claimed in claim 10, further determining a maximum switching frequency of the switching signal by a resistor.

12. The method as claimed in claim 10, wherein detecting the state of the transistor is implemented by a diode coupled to the transistor.

13. The method as claimed in claim 10, further comprising:
    generating a control signal according to the feedback signal, a maximum-frequency signal, and the state of the transistor;
    generating an oscillation signal according to the control signal; and
    generating the switching signal according to the oscillation signal and the maximum-frequency signal.

14. The method as claimed in claim 10, wherein a pulse-width modulation (PWM) of the switching signal will be started once the switching frequency of the resonant power converter reaches a maximum switching frequency.

15. The method as claimed in claim 10, further limiting a minimum pulse-width of the switching signal by a PWM-clamp circuit for achieving the ZVS of the transistor.

16. The method as claimed in claim 10, further limiting a minimum switching frequency of the switching signal by a minimum-frequency-clamp circuit for achieving the ZVS of the transistor.

17. The method as claimed in claim 10, further claming a first control signal by a first sample-hold circuit for limiting a minimum switching frequency; wherein the first control signal is related to the feedback signal.

18. The method as claimed in claim 10, further clamping a second control signal by a second sample-hold circuit for limiting a minimum pulse width of the switching signal; wherein the second control signal is related to the feedback signal.

\* \* \* \* \*